(12) United States Patent
Weiland et al.

(10) Patent No.: US 9,216,540 B2
(45) Date of Patent: Dec. 22, 2015

(54) ULTRASONIC WELDING DEVICE AND METHOD OF OPERATING SAID DEVICE

(71) Applicant: AIRBUS HELICOPTERS DEUTSCHLAND GMBH, Donauworth (DE)

(72) Inventors: Frank Weiland, Munich (DE); Uwe Beier, Hoehenkirchen-Siegertsbrunn (DE); Stefan Gubernatis, Munich (DE); Christian Weimer, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 307 days.

(21) Appl. No.: 13/857,604

(22) Filed: Apr. 5, 2013

(65) Prior Publication Data

US 2013/0263999 A1     Oct. 10, 2013

(30) Foreign Application Priority Data

Apr. 5, 2012   (EP) .................................. 12400009

(51) Int. Cl.
*B32B 37/00*     (2006.01)
*B29C 65/08*     (2006.01)
(Continued)

(52) U.S. Cl.
CPC ................. *B29C 65/08* (2013.01); *B23K 20/10* (2013.01); *B23K 20/106* (2013.01); *B29C 65/7847* (2013.01); *B29C 66/532* (2013.01); *B29C 66/721* (2013.01); *B29C 66/8161* (2013.01); *B29C 66/8167* (2013.01); *B29C 66/863* (2013.01); *B29C 66/7212* (2013.01);
(Continued)

(58) Field of Classification Search
CPC ...... B23K 20/10; B23K 20/106; B29C 65/08; B29C 65/7847; B29C 66/532; B29C 66/721; B29C 66/8161; B29C 66/8167; B29C 66/863
USPC ............... 156/64, 73.1, 362, 538, 556, 580.1, 156/580.2
See application file for complete search history.

(56) References Cited

U.S. PATENT DOCUMENTS

| 3,821,048 A | 6/1974 | Acker et al. |
| 4,527,727 A | 7/1985 | Renshaw |

(Continued)

FOREIGN PATENT DOCUMENTS

| CN | 101391343 A | 3/2009 |
| DE | 3411933 A1 | 10/1984 |

(Continued)

OTHER PUBLICATIONS

Japanese Notice of Reasons for Rejection, Application No. 2013-079447, Mailing Dated: Mar. 18, 2014, Mailing No. 164515, 4 Pages.
(Continued)

*Primary Examiner* — James Sells
(74) *Attorney, Agent, or Firm* — Brooks Kushman P.C.

(57) ABSTRACT

The invention is related to an ultrasonic welding device (5) comprising: an adapter frame (6); an ultrasonic horn (7) driven by a adapter frame mounted converter (8). A pick member (9) comprises grippers (11-14). Passive clamping means are provided with a press pad (10). Control means and activation means (15) are provided for controlled activation of the pick member (9) and the ultrasonic horn (7). The invention is further related to a method of operating said device.

20 Claims, 2 Drawing Sheets

(51) Int. Cl.
*B23K 20/10* (2006.01)
*B29C 65/78* (2006.01)
*B29C 65/00* (2006.01)
*B29L 31/30* (2006.01)
*B29L 31/00* (2006.01)

(52) U.S. Cl.
CPC .... *B29L2031/3076* (2013.01); *B29L 2031/724* (2013.01); *Y10T 156/17* (2015.01)

(56) References Cited

U.S. PATENT DOCUMENTS

| | | | | |
|---|---|---|---|---|
| 4,629,530 A | * | 12/1986 | Becking | 156/502 |
| 4,935,081 A | * | 6/1990 | Becking | 156/157 |
| 5,207,854 A | * | 5/1993 | Becking | 156/350 |
| 5,480,501 A | | 1/1996 | Stewart et al. | |
| 2008/0023529 A1 | | 1/2008 | Reatherford et al. | |

FOREIGN PATENT DOCUMENTS

| | | |
|---|---|---|
| GB | 1219894 | 1/1971 |
| GB | 1219894 A | 1/1971 |
| GB | 1442251 | 7/1976 |
| JP | 60239224 A | 11/1985 |
| JP | 06282042 A | 10/1994 |
| JP | 2002043377 A | 2/2002 |
| JP | 2007123937 A | 5/2007 |
| JP | 2010046941 A | 3/2010 |

OTHER PUBLICATIONS

European Search Report; Application No. EP 12 40 00009; date of completion of search Oct. 9, 2012.

* cited by examiner

ULTRASONIC WELDING DEVICE AND METHOD OF OPERATING SAID DEVICE

CROSS REFERENCE TO RELATED APPLICATIONS

This application claims priority to European patent application No. EP 12400009.2 filed Apr. 5, 2012, the disclosure of which is incorporated in its entirety by reference herein.

BACKGROUND OF THE INVENTION (1) Field of the Invention

The invention is related to an ultrasonic welding device with the features of the preamble of claim 1. The invention is further related to a method of operating said device with the features of the preamble of claim 13.

(2) Description of Related Art

Ultrasonic welding technology is used to weld elements to increase energy/time efficiency.

The document CN101391343 A discloses an ultrasonic welding machine clamper fast conversion device, comprising a welding machine seat, a clamper, and additionally a welding head directional plate, a welding pad plate, a Y axis trimming plate and an X axis trimming plate with grooves of a locating pin of a locating plate, a trimming button and a bottom plate with a groove.

The document U.S. 2008/0023529 A1 discloses an ultrasonic welding apparatus and method for detaching or effecting release of an ultrasonic welding tool stuck or attached to a weldment. The method includes the step of utilizing a mechanism mounted adjacent to the ultrasonic welding tool to hold the weldment in position during welding and/or while the ultrasonic welding tool is withdrawn and, if necessary, using the mechanism to detach the weldment from the ultrasonic welding tool. The method contemplates providing a twist, rotary or axial motion to one of the ultrasonic welding tool or weldment to effect release of the ultrasonic welding tool. The apparatus may include a clamp member having a distinct clamping area or pad located adjacent to the sonotrode or anvil of the ultrasonic welding tool. The clamp mechanism provides vibration control, noise mitigation, and a more uniform boundary condition during welding and facilitates part release upon the completion of the welding process.

The document DE 3411933 A1 discloses an ultrasonic spot welding apparatus including a welding tip and a complimentary anvil, both mounted on a stationary welding frame and between which workpieces may be inserted for welding. The welding tip includes a vibratory reed adapted to introduce into and through the workpieces high frequency vibratory energy in order to effect a weld between the workpieces.

The apparatus includes a reed stabilizer for clamping about and stabilizing the vibratory reed at its nodal point and clamping means for clamping the workpieces. The clamping means are mounted on a clamping frame which is pivotably mounted to the stationary welding frame. In an effort to reduce workpiece movement and produce consistent, strong welds, it has been found necessary to utilize a clamping system at or near the spot to be welded to tightly hold together the workpieces so as to prevent them from moving or twisting due to the powerful forces generated during the welding procedure.

Additionally, control must be established over the mechanical waves and forces that are emitted from the working area so that these forces are not strong enough to damage those areas of the workpieces remote from the work spot. Absence of positive control over these forces has resulted in a degree of uncertainty with respect to the normal integrity of prior welds, bonds, mechanical attachments or stress concentrations. Clamping of the workpiece W is effected by movable collar clamp about the anvil and stationary collar clamp about the welding tip. Movable collar clamp is mounted on clamp housing which can be raised and lowered along rails by hydraulic clamp cylinders. Stationary collar clamp, which surrounds the welding tip, is mounted on clamping frame.

The document U.S. Pat. No. 5,480,501 A discloses an ultrasonic apparatus and method for placing individual pillowed chips of light lock material in a cartridge. A vacuum plate mounted on a pivotable arm picks up a chip and releases it into a cartridge. The cartridge has a recessed area into which the pillowed edge of the chip fits. Once positioned with the cartridge, utilizing a tuck plate, the chip is sealed in place using an ultrasonic horn.

The document GB 1219894 A discloses an ultrasonic welding apparatus with a vibrator for transmitting ultrasonic vibrations to the surface of a workpiece and mounted within a housing which includes an end portion resiliently connected to the body of the housing, the end portion extending coaxially around the tip of the vibrator such that, during a welding operation, when the tip is in contact with a workpiece, pressure is resiliently applied to the workpiece, around the area being welded, through the end portion.

The document GB 1442251 A discloses ribbon segments made from heat fusible material and spliced by locating these segments in proper relationship for splicing, tensioning at least one of the segments, and splicing the segments while said at least one ribbon segment remains tensioned.

BRIEF SUMMARY OF THE INVENTION

It is an object of the invention to provide an ultrasonic welding device to further automatize ultrasonic welding. It is a further object of the invention to provide a method of operating said device.

The solution is provided with an ultrasonic welding device with the features of claim 1 and with a method of operating said device with the features of claim 13.

According to the invention an ultrasonic welding device is attached to an adapter frame. An ultrasonic horn of the ultrasonic welding device is driven by a converter arranged central with regard to said adapter frame. The adapter frame can be driven for moving said ultrasonic horn into engagement with a workpiece, particularly into engagement with a preform, to perform an ultrasonic welding operation on said workpiece to weld the preform to another fixed workpiece of fibre reinforced plastics (FRP) component, particularly another fixed preform.

A pick member of the inventive ultrasonic welding device is provided for operative engagement with said workpieces, the pick member being resiliently mounted to said adapter frame. Passive clamping means at a press pad of the inventive ultrasonic welding device are resiliently mounted to said adapter frame alternatively to the pick member or the pick member combined with the passive clamping means at the press pad are resiliently mounted to said adapter frame. Control means and activation means are provided at the inventive ultrasonic welding device for controlled activation of the pick member and the ultrasonic horn for conveyance and a subsequent ultrasonic welding operation with said workpieces to weld the preform to the fixed workpiece of fibre reinforced plastics (FRP) component.

The inventive ultrasonic welding device adds additional functionalities to an ultrasonic preform welding robot head allowing either pick-up or passive clamping or combined pick-up and passive clamping unilaterally from one side of any workpieces providing the advantage of free movements of the inventive ultrasonic welding device relative to fixed workpieces with varying dimensions thus avoiding the limitations for dimensions of workpieces resulting from ultrasonic welding devices of the state of the art, said ultrasonic welding devices of the state of the art allowing exclusively processing of movable workpieces, whereas the inventive ultrasonic welding devices allow free movements of the inventive ultrasonic welding device relative to fixed workpieces and thus ultrasonic welding of movable workpieces to fixed workpieces. These functionalities are perfectly complementing the ultrasonic horn in the creation of local welds. These local welds may be used advantageously to assemble binder preform elements or mount small preform patches onto big fixed preforms for local reinforcement of load critical areas in carbon fibre reinforced plastics (CFRP) components, such as applied for aircraft doors.

The inventive ultrasonic welding device allows the integration of a pick-functionality with a further optional passive clamp functionality into the ultrasonic horn. The inventive ultrasonic welding device optionally avoids that a preform for welding needs to be carried and placed manually, which is expensive, time consuming and lacks reproducibility. The inventive ultrasonic welding device further avoids that a specific metal pattern—additionally to an underlying tool—are needed for every welding operation on the preform and allows dispense with the need to manually attach this pattern, which is time consuming, complex in geometry and thus expensive to manufacture. Thus the principal advantages of the invention are: integration of related functionalities into an ultrasonic welding device to save tooling costs and process time, —Reduction of tooling costs due to decreased complexity of passive clamping means and less parts, —Reduction of assembly preparation time, —Increase of automation of assembly process, —Increase of part quality and—substitution of more complex machinery.

According to a preferred embodiment of the invention the pick member comprises a press pad, said press pad being preferably mounted to the adapter frame. The press pad provides stability and orientation to the grippers of the pick member.

According to a further preferred embodiment of the invention the press pad is provided with clamping means. According to the invention said press pad with clamping means allows clamping of the preforms to be welded by means of the press pad to avoid cambering and/or yielding of the fixed workpieces of carbon fibre reinforced plastics (CFRP) components during ultrasonic weldment to the workpieces.

According to a further preferred embodiment of the invention press pad comprises a central cut out for said ultrasonic horn allowing the press pad to hold on to the workpieces during welding.

According to a further preferred embodiment of the invention the grippers are needle grippers or freezing grippers.

According to a further preferred embodiment of the invention the activation means comprise pneumatic supply means. The pneumatic supply means supply pressurized air as bypass relative to the respective pneumatic grippers, to create negative pressure according to the Bernoulli rule at the centre under the respective pneumatic grippers for suction of the preforms to the respective pneumatic grippers. The pressurized air is deviated from a coupling of the inventive ultrasonic welding device. According to an alternative preferred embodiment of the invention the pneumatic supply means provide low pressure/vacuum to the respective pneumatic grippers for suction of the preforms to the respective pneumatic grippers.

According to a further preferred embodiment of the invention the press pad is symmetrically mounted with regard to said ultrasonic horn by respective spring legs to four pneumatic grippers integrated into the mounting means.

According to a further preferred embodiment of the invention the press pad comprises a clamping ring or a preferably entirely clamping surface.

According to a further preferred embodiment of the invention the adapter frame is adjustable relative to the ultrasonic horn to allow adjustment of the distance between the press pad and said ultrasonic horn and thus to allow changes of the pressure of the press pad on the workpieces during welding.

According to a further preferred embodiment of the invention the ultrasonic welding device is operated manually relative to fixed workpieces.

According to a preferred embodiment of the invention the method of operating first moves said ultrasonic welding device with the pick element towards the preform element to be welded. The pick element with the grippers is activated by a control unit to grip the preform element. The ultrasonic welding device moves the preform element to the weld position at the fixed preform. Once the weld position reached the ultrasonic horn is driven into contact with the preform element till exerting some pressure to the preform. Ultrasound is induced through the ultrasonic horn to the preform element to be welded and the weld is accomplished.

According to a further preferred embodiment of the invention the distance of the press pad relative to the ultrasonic horn is adjustable to allow changes of the pressure from the press pad to the preform during welding, said variable pressure being controllable by means of the mounting means being conceived as spring legs.

BRIEF DESCRIPTION OF THE SEVERAL VIEWS OF THE DRAWINGS

A preferred embodiment of the invention is presented with reference to the following description and the attached drawings.

DETAILED DESCRIPTION OF THE INVENTION

Figure 1:
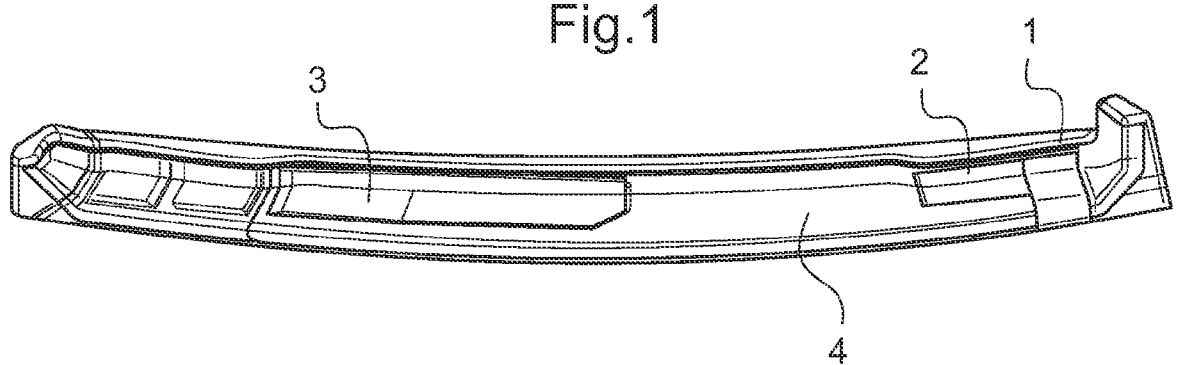
FIG. 1 shows a spherical view of small preforms mounted onto an aircraft's door edge member according to the state of the art.

According to FIG. 1 workpieces, such as small patches of preforms 1, 2, 3 are attached to a fixed preform 4 on a tooling as further workpiece made of carbon fibre reinforced plastics (CFRP) components. Said preforms 1-4 are defined as composite elements of partly or fully impregnated fabric material.

Figure 2:
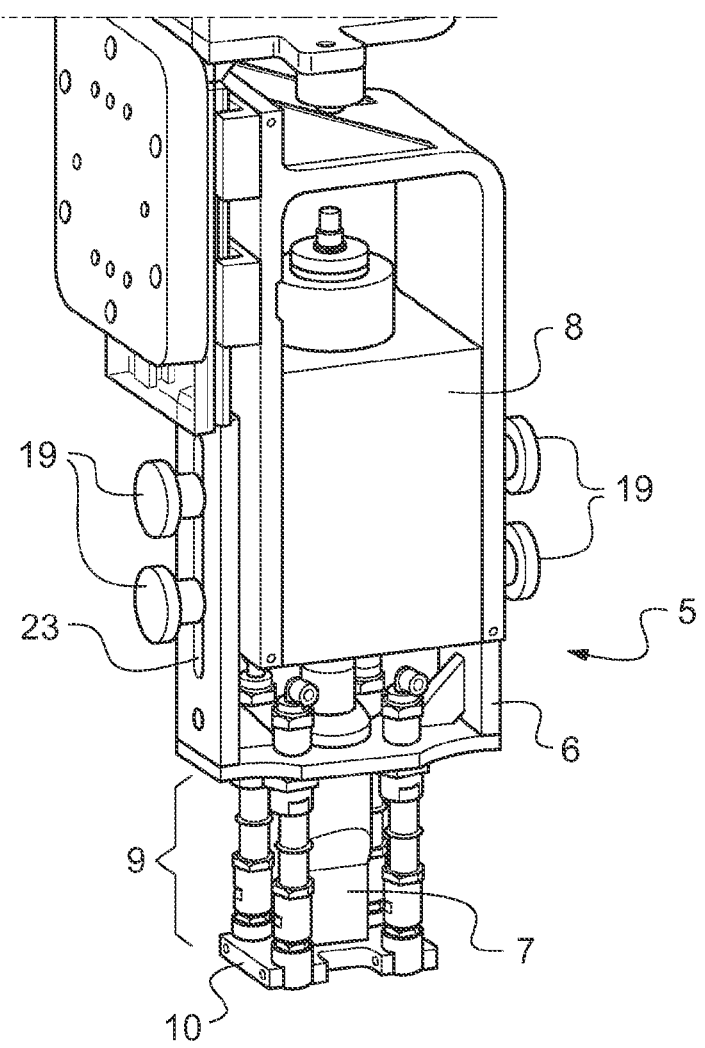
FIG. 2 shows a spherical view of an ultrasonic welding device according to the invention.
Figure 3:
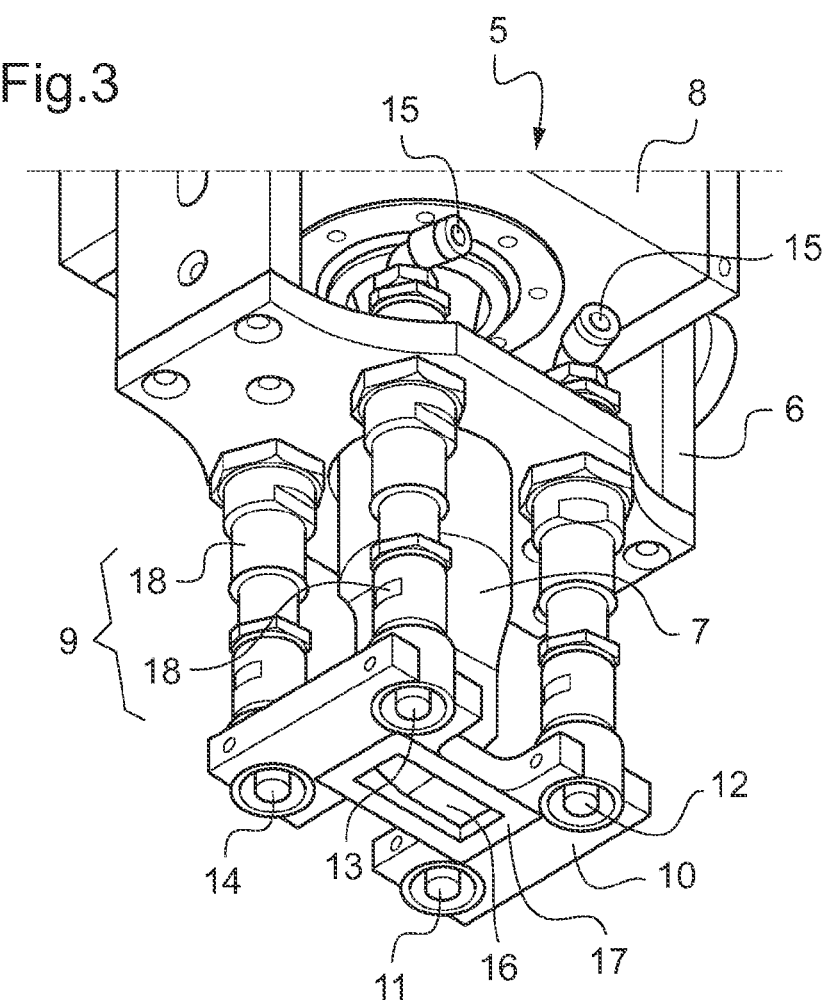
FIG. 3 shows a further spherical view from a different point of view of an ultrasonic welding device according to the invention.

According to FIGS. 2 and 3 an ultrasonic welding device 5 is mounted inside an adapter frame 6. Control means (not shown) are provided for control of said ultrasonic welding device 5. An ultrasonic horn 7 is actuated by activation means 15 comprising a converter 8 of the ultrasonic welding device 5. The ultrasonic horn 7 is oriented parallel to said adapter frame 6. The adapter frame 6 is mounted to two opposed surfaces of the converter 8 with adjustment means 19 allowing adjustment of the adapter frame 6 parallel to said ultrasonic horn 7.

A pick member 9 is mounted to said adapter frame 6 with the ultrasonic horn 7 centrally inside. The pick member 9 comprises a press pad 10, four rectangular arranged pneumatic grippers 11-14, pneumatic supply means 15 with four separate supply lines integrated into spring legs 18 with essentially equal lengths from the respective pneumatic supply means 15 to the respective pneumatic grippers 11-14. The pneumatic supply means 15 supply pressurized air to bypass the respective pneumatic grippers 11-14 and to create negative pressure according to the Bernoulli rule at the centre under the respective pneumatic grippers 11-14 for suction of the preforms 1, 2, 3 to the respective pneumatic grippers 11-14.

The four separate spring legs 18 are conceived respectively as resilient mounting means for the press pad 10 to the adapter frame 6. Instead of the pneumatic grippers 11-14, needle grippers or freezing grippers could be used with correspondingly adapted supply means 15. The press pad 10 stands over the ultrasonic horn 7 with the ultrasonic horn 7 being central relative to a rectangular cut out 16 in the press pad 10.

Passive clamp means, e.g. a central clamp ring 17 or a clamping surface, are provided coaxial to the rectangular cut out 16 in the press pad 10. The clamp ring 17 or the clamping surface are made of tacky cork for improved adherence. Passive clamping functionality is provided by moving the adapter frame 6 towards the workpieces 1, 2, 3 and the fixed workpiece 4 at the tooling and the reactive forces from the workpieces 1, 2, 3 and the fixed workpiece 4 at the tooling provide the clamping pressure at the press pad 10 as a function of the stiffness and the predetermined spring stroke of the four separate spring legs 18 said spring stroke being determined by the distance of the press pad 10 to the ultrasonic horn 7.

The distance of the press pad 10 relative to the ultrasonic horn 7 is adjustable with screws 19 interacting with longitudinal slits 23 for mounting said adapter frame 6 to the converter 8.

The control means control the pneumatic supply means 15.

Figure 4:
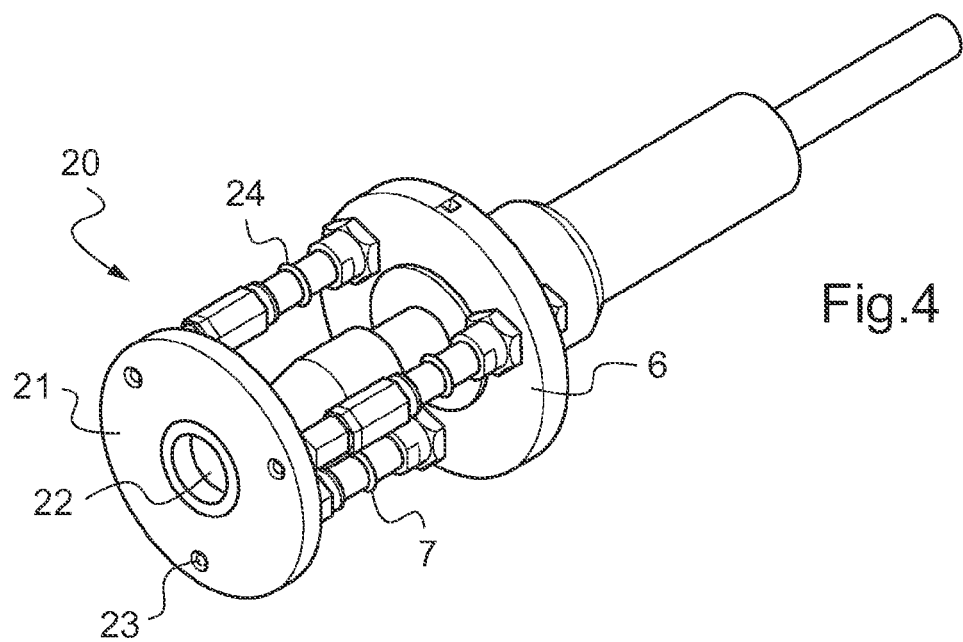
FIG. 4 shows a spherical view of a manual ultrasonic welding device according to the invention.

According to FIG. 4 corresponding features are referred with the same references. An ultrasonic welding device 20 is manually operated. The press pad 21 and the cut out 22 are circular and the press pad 21 is resiliently mounted to the adapter frame 6 by means of three spring legs 24.

The ultrasonic horn 7 is centrally arranged relative to the spring legs 24. A mechanical link 25 transfers mechanical ultrasound vibrations from a generator (not shown) to the ultrasonic horn 7.

Method of Operating the Ultrasonic Welding Device

The screws 19 fixing the adapter frame 6 to the converter 8 are untightened and the adapter frame 6 is moved along the longitudinal slits 23 to adjust the distance between the ultrasonic horn 7 and the press pad 10 and/or the grippers. The adapter frame 6 is fixed to the converter 8 by the screws 19.

First said ultrasonic welding device 5 with the pick member 9 is moved towards the workpieces 1, 2 or 3, such as preforms, to be welded. Coordinates of the ultrasonic welding device 5 relative to the workpieces 1, 2, 3 or the fixed workpiece 4 at the tooling are available in the control unit for control of said ultrasonic welding device 5 with the pick member 9. The grippers 11-14 at the pick member 9 are activated by the control means and the workpieces 1, 2 or 3 are gripped by means of the grippers 11-14 as soon as the grippers 11-14 have reached the workpieces 1, 2 or 3.

The workpieces 1, 2, 3 are moved to a weld position at a fixed workpiece 4 of a CFRP tooling by means of the ultrasonic welding device 5. Coordinates of the weld position are available in the control unit for control of said ultrasonic welding device 5 with the pick member 9.

Pressure is applied by means of the pick member 9 via the press pad 10 of the ultrasonic welding device 5 to the workpieces 1, 2, 3 and the fixed workpiece 4 at the tooling to be welded once the workpieces 1, 2 or 3 have reached their weld position. The spring legs 18 give way to the pressure via the press pad 10 and the ultrasonic horn 7 is moved through the cut out 16 in the press pad 10 till exerting some pressure of up to 10 bar to the workpieces 1, 2, 3 and the fixed workpiece 4 at the tooling. Ultrasound is introduced from the converter 8 through the ultrasonic horn 7 to the workpieces 1, 2, 3 and the fixed workpiece 4 at the tooling to be welded till the weld is accomplished.

Subsequently the ultrasonic welding device 5 is available for a new pick and weld operation.

Alternatively the press pad 21 of the hand guided ultrasonic welding device 20 is manually positioned on workpieces 1, 2, 3 and the fixed workpiece 4 at the tooling (not shown). The press pad 21 of the hand guided ultrasonic welding device 20 is manually pressed against the workpieces 1, 2, 3 and the fixed workpiece 4 at the tooling such that the spring legs 24 are compressed and the ultrasonic horn 7 can move relative to the spring legs 24. The ultrasonic horn 7 is guided along leading members, integrated into a break through with a certain guiding length of the adapter frame 6 and ensuring orientation of said ultrasonic horn 7. Said ultrasonic horn 7 is driven through the cut-out 22 in said press pad 21 by manual force to the adapter frame 6 compressing said three spring legs 24. The ultrasonic horn 7 is brought to contact with the preform, ultrasound is induced and a local bond between workpieces 1, 2, 3 and a fixed workpiece 4 on the tooling to be welded is created.

REFERENCE LIST 1 preform
2 preform
3 preform (workpieces)
4 fixed preform on tooling
5 ultrasonic welding device
6 adapter frame
7 ultrasonic horn
8 converter
9 pick member
10 press pad
11 pneumatic gripper
12 pneumatic gripper
13 pneumatic gripper
14 pneumatic gripper
15 supply means
16 cut out
17 clamp ring
18 spring legs
19 adjustment means
20 ultrasonic welding device
21 press pad
22 cut out
23 gripper
24 spring legs
25 mechanical link

What is claimed is:

1. An ultrasonic welding device comprising:
an adapter frame, an ultrasonic horn and a converter, said ultrasonic horn being driven by the adapter frame mounted converter for ultrasonic welding of workpieces to at least one fixed workpiece on a tooling, said workpieces being particularly preforms,
wherein said at least one fixed workpiece is a fiber reinforced plastics (FRP) component, wherein said ultrasonic horn is movable towards the workpieces, the ultrasonic horn being centrally inside the adapter frame, and wherein the ultrasonic welding device further comprises a pick member;
wherein the pick member comprises:
a press pad mounted resiliently to said adapter frame,
passive clamping means located on the press pad for improved adherence of the workpieces when the press pad exerts a pressure on the workpieces, and
grippers located on the press pad and suitable for the workpieces so that the workpieces are movable to a weld position at the fixed workpiece by means of control means controlling the coordinates of the ultrasonic welding device relative to the workpieces and activation means for controlled activation of the pick member and the ultrasonic horn.

2. The ultrasonic welding device according to claim 1, wherein the control means and the activation means are configured to perform conveyance and a subsequent ultrasonic welding operation with said workpieces and fixed workpiece on the tooling.

3. The ultrasonic welding device according to claim 1, wherein the grippers are pneumatic-, needle- or freezing-grippers.

4. The ultrasonic welding device according to claim 2, wherein the activation means comprise pneumatic supply means.

5. The ultrasonic welding device according to claim 4, wherein the pneumatic supply means are fed by pressure or vacuum supply means.

6. The ultrasonic welding device according to claim 1, wherein the press pad comprises a preferably central cut out for said ultrasonic horn.

7. The ultrasonic welding device according to claim 1, wherein the press pad is with regard to said ultrasonic horn symmetrically mounted by spring legs to the adapter frame.

8. The ultrasonic welding device according to claim 1, wherein the passive clamping means of the press pad comprises a clamping ring or clamping surface.

9. The ultrasonic welding device according to claim 1, wherein the press pad has an essentially circular or rectangular shaped surface for contact to the workpieces and/or to the at least one fixed workpiece on the tooling.

10. The ultrasonic welding device according to claim 1, wherein the adapter frame is adjustable coaxial to said ultrasonic horn.

11. The ultrasonic welding device according to claim 1, wherein the device is operated manually.

12. A method of operating the ultrasonic welding device according to claim 1, characterized by first moving said ultrasonic welding device by means of a mechanism towards workpieces, such as workpieces to be welded, activating grippers of a pick member at an ultrasonic horn by means of a control unit and gripping the workpieces by means of the grippers, moving the workpieces to a weld position with a fixed workpiece at a tooling by means of the mechanism of the ultrasonic welding device, applying pressure to the workpieces and the fixed workpiece at the tooling to be welded by means of the passive clamping means of the press pad once the weld position is reached, moving the ultrasonic horn to compress the workpieces to the fixed workpiece at the tooling, inducing ultrasound through the ultrasonic horn to the workpieces to be welded to the fixed workpiece on the tooling and accomplishing the weld.

13. The method according to claim 12, characterized by adjusting the distance of the press pad relative to the ultrasonic horn.

14. The method according to claim 12, characterized by clamping the workpieces to be welded to the fixed workpiece at the tooling by means of the ultrasonic horn.

15. An ultrasonic welding device comprising:
an adapter frame;
a converter mounted to the frame;
an ultrasonic horn mounted in a central region of the frame and driven by the converter, the horn adapted for ultrasonic welding a preform workpiece to a fixed workpiece made of a fiber reinforced plastic on a tooling;
a pick member mounted to an end of the frame by a series of spring legs, the pick member having a press pad defining a central cut out surrounded by a clamping surface and a series of grippers; and
at least one controller configured to control coordinates of the adapter frame and control the pick member to move the preform workpiece to a weld position at the fixed workpiece, and control the converter and the ultrasonic horn;
wherein the ultrasonic horn passes through the cut out of the press pad when the spring legs are in a compressed state to contact the preform workpiece.

16. The ultrasonic welding device of claim 15 wherein the ultrasonic horn is perpendicular to the clamping surface of the press pad.

17. The ultrasonic welding device of claim 15 wherein the grippers are pneumatic grippers; and
wherein each gripper of the series of grippers is positioned at an end of a respective spring leg of the series of spring legs, a pneumatic supply line integrated into the spring leg and in fluid communication with the gripper.

18. The ultrasonic welding device of claim 15 wherein the clamping surface comprises a tacky cork.

19. The ultrasonic welding device of claim 15 wherein the clamping surface of the press pad is configured to exert a passive clamping force on the preform workpiece and the fixed workpiece as a function of a stiffness and a spring stroke of each spring leg of the series of spring legs.

20. The ultrasonic welding device of claim 15 wherein the adapter frame has longitudinal slits; and
wherein the converter and the ultrasonic horn are connected to the adapter frame using screws extending through the longitudinal slits of the adapter frame; and
wherein a distance of the ultrasonic horn relative to the press pad is configured to be adjusted by changing a position of the screws within the longitudinal slits.

* * * * *